(12) United States Patent
Hu et al.

(10) Patent No.: US 11,650,490 B2
(45) Date of Patent: May 16, 2023

(54) PROJECTION DEVICE AND COLOR GAMUT ADJUSTMENT METHOD

(71) Applicant: APPOTRONICS CORPORATION LIMITED, Guangdong (CN)

(72) Inventors: Fei Hu, Shenzhen (CN); Zuqiang Guo, Shenzhen (CN); Yi Li, Shenzhen (CN)

(73) Assignee: Appotronics Corporation Limited, Guangdong (CN)

( * ) Notice: Subject to any disclaimer, the term of this patent is extended or adjusted under 35 U.S.C. 154(b) by 173 days.

(21) Appl. No.: 16/964,165

(22) PCT Filed: Mar. 28, 2018

(86) PCT No.: PCT/CN2018/080894
§ 371 (c)(1),
(2) Date: Dec. 29, 2020

(87) PCT Pub. No.: WO2019/144494
PCT Pub. Date: Aug. 1, 2019

(65) Prior Publication Data
US 2021/0149287 A1    May 20, 2021

(30) Foreign Application Priority Data
Jan. 23, 2018   (CN) .......................... 201810062933.1

(51) Int. Cl.
*G03B 21/20*     (2006.01)
*H04N 9/31*      (2006.01)

(52) U.S. Cl.
CPC ....... *G03B 21/204* (2013.01); *G03B 21/2013* (2013.01); *H04N 9/3155* (2013.01); *H04N 9/3161* (2013.01); *H04N 9/3182* (2013.01)

(58) Field of Classification Search
CPC .............. G03B 21/204; G03B 21/2013; G03B 21/2033; G03B 21/206; G03B 33/00; H04N 9/3155; H04N 9/3161; H04N 9/3182

See application file for complete search history.

(56) References Cited

U.S. PATENT DOCUMENTS

2012/0147065 A1* 6/2012 Byun ................... G09G 3/3208
                                                                  345/77
2016/0297357 A1* 10/2016 Hayakawa ............ F21S 41/675
(Continued)

FOREIGN PATENT DOCUMENTS

| CN | 1717028 A | 1/2006 |
|---|---|---|
| CN | 1811897 A | 8/2006 |

(Continued)

OTHER PUBLICATIONS

Extended European Search Report in Application No. 18902127.2, dated Sep. 15, 2021.
(Continued)

*Primary Examiner* — Michael E Teitelbaum
(74) *Attorney, Agent, or Firm* — Knobbe, Martens, Olson & Bear, LLP

(57) ABSTRACT

A projection device, comprising a light source device and a control device. The light source device is configured to, according to instructions, emit laser light of first primary color, second primary color, third primary color, and a fourth mixed color fluorescence, respectively. The control device is configured to determine a color gamut range of pixels of an image to be modulated, and transmit the instructions according to the color gamut range to control the light source device to output light required for modulation of the image to be modulated from the laser light of first primary color laser, second primary color, third primary color, and fourth mixed color fluorescence, respectively. The device and
(Continued)

method are capable of modulating an image with a wide color gamut, and also save light source energy.

16 Claims, 7 Drawing Sheets

(56) References Cited

U.S. PATENT DOCUMENTS

2017/0329214 A1  11/2017  Guo et al.
2018/0180251 A1*  6/2018  Tian .................. G03B 21/2066

FOREIGN PATENT DOCUMENTS

| CN | 101369090 A | 2/2009 |
| CN | 101582249 A | 11/2009 |
| CN | 101750855 A | 6/2010 |
| CN | 101984487 A | 3/2011 |
| CN | 102568376 A | 7/2012 |
| CN | 102645828 A | 8/2012 |
| CN | 105022212 A | 11/2015 |
| CN | 106021050 A | 10/2016 |
| CN | 106292142 A | 1/2017 |
| WO | WO 2015/161810 A1 | 10/2015 |

OTHER PUBLICATIONS

Chinese Office Action issued in application No. 2018100629331 dated Nov. 6, 2020.
International Search Report of corresponding PCT Application No. PCT/CN2018/080894—4 pages (dated Aug. 23, 2018).

* cited by examiner

PROJECTION DEVICE AND COLOR GAMUT ADJUSTMENT METHOD

TECHNICAL FIELD

The present disclosure relates to the field of display technology and, in particular, to a projection device with an adjustable color gamut and a method for adjusting color gamut.

BACKGROUND

Low power consumption and good image quality are goals pursued by the display industry. Consumers pay attention to not only technical indicators and product prices of the products when choosing the display, power consumption and display effect have become important consideration factors when choosing the display. Multi-color light sources are widely used in various application scenarios of projection display. In a light source system of the related art, excitation light generated by an excitation light source is incident on a color wheel after being condensed by a lens, and a plurality of phosphor regions, such as a green phosphor region, a red phosphor region, and a blue phosphor region, are respectively provided on the color wheel along a circumferential direction. The fluorescent color wheel is rotated under driving of a drive device, so that the above regions on the color wheel are alternately placed in a transmission path of the excitation light generated by the excitation light source, so as to convert the excitation light incident thereon into green light, red light or blue light, to form a colorful light sequence. The above colorful light sequence is further used for subsequent projection display. For example, when the color wheel is rotated at a frequency of 60 Hz (16.6 ms for one revolution), each of the R, G, B regions takes up 5.5 ms to generate corresponding light.

SUMMARY

Technical Problems

However, brightness of emitted light of the light source system in the above technical solution is limited, and the mode of the emission brightness thereof is relatively simple. In other words, when the projection device is applied to different scenarios, brightness of the emitted light is not adjustable. In view of this, there are some improved technical solutions, in which, by adding a Y segment on the color wheel and coating yellow phosphor on the Y segment, the excitation efficiency will be greatly improved since an excitation efficiency of the yellow phosphor is much higher than that of red or green phosphor. When the projection device is in a scenario with high ambient light, it can make the yellow phosphor be excited to generate yellow fluorescent light by turning on a time-protection laser light source, so as to improve the brightness of the emitted light. In another aspect, when the projection device is in a scenario of a dark environment, such as during projection, it can be realized, by turning off the laser light when the color wheel is controlled to be rotated to the Y segment, that the yellow phosphor in the Y segment will not be excited, so as to reduce the brightness of the emitted light.

However, with the continuous improvement of our living standards, people began to increasingly pursue visual enjoyment. In other words, people increasingly want to see images that are in a color very close to realities, and this requires a color gamut of the projection device to be wide enough. Although the above solution where the yellow phosphor are used in the Y-segment can improve the brightness of the emitted light, and an output scheme of red laser light, green laser light combined with the yellow fluorescent light can generate a modulated image, since the yellow fluorescent light is only used for the purpose of improving the brightness of the emitted light, the range of a modulation color gamut thereof is very limited. Also, the red laser light and the green laser light are expensive and thus the cost is too high.

Therefore, it is actually necessary to provide a color gamut adjusting device and a method for adjusting color gamut that can broaden the color gamut range, enhance the visual effect of users, save energy of the light source, and reduce the cost.

Technical Solutions

An object of the present disclosure is to provide a projection device capable of modulating images with a wide color gamut range and capable of effectively saving energy of a light source, and a method for adjusting color gamut applied to the projection device.

A projection device, including:

a light source device configured to emit, according to instructions, laser light of a first primary color, laser light of a second primary color, laser light of a third primary color and fluorescent light of a fourth mixed color; wherein the laser light of the first primary color, the laser light of the second primary color and the fluorescent light of the fourth mixed color are capable of being modulated into an image in a first color gamut range; the laser light of the first primary color, the laser light of the third primary color and the fluorescent light of the fourth mixed color are capable of being modulated into an image in a second color gamut range; and the first color gamut range and the second color gamut range are combined into a continuous color gamut range; and a control device configured to determine a color gamut range of pixels of an image to be modulated, and transmit the instructions according to the color gamut range, to control the light source device to output light, from the laser light of the first primary color, the laser light of the second primary color, the laser light of the third primary color, and the fluorescent light of the fourth mixed color, required for modulation for the image to be modulated.

In this embodiment, the laser light is configured for modulation of the image, and an image with a wide color gamut can be modulated, and the color gamut range of the pixels of the image to be modulated is also determined, the light source device is controlled to output required light according to the color gamut range, while unnecessary light can be turned off, thereby saving energy of the light source.

Brightness and time periods of the light emitted by the light source device correspond to the instructions.

The fluorescent light of the fourth mixed color includes fluorescent light of the second primary color and fluorescent light of the third primary color, and in a specific embodiment, the fluorescent light of the fourth mixed color or the fluorescent light of the second primary color or the fluorescent light of the third primary color therein may be used as one of the light sources for modulating.

In an embodiment, the light source device is configured to, when the pixels of the image to be modulated belong to the first color gamut range, output the laser light of the first primary color, the laser light of the second primary color and the fluorescent light of the fourth mixed color, for modulation for the image to be modulated;

the light source device is configured to, when the pixels of the image to be modulated belong to the second color gamut range, output the laser light of the first primary color, the laser light of the third primary color and the fluorescent light of the fourth mixed color, for modulation for the image to be modulated; and the light source device is configured to, when the image to be modulated includes pixels belonging to the first color gamut range and pixels belonging to the second color gamut range, output the laser light of the first primary color, the laser light of the second primary color, the laser light of the third primary color and the fluorescent light of the fourth mixed color, for modulation for the image to be modulated.

The pixels of the image to be modulated belong to the first color gamut range or belong to the second color gamut range mentioned above means that all belong to, or a vast majority thereof belong to the first color gamut range or belong to the second color gamut range, and the vast majority mentioned here means that more than 90% of the pixels of the image to be modulated belong to the first color gamut range or belong to the second color gamut range.

In this embodiment, the laser light of the second primary color or the laser light of the third primary color can be turned off according to the color gamut range to which the image to be modulated belongs, thus the energy of the laser light source can be effectively saved on the basis of adjusting the image with a wide color gamut range.

Furthermore, in this embodiment, the light source device is configured to, when the pixels of the image to be modulated belong to the first color gamut range, output the laser light of the first primary color, the laser light of the second primary color, and the fluorescent light of the fourth mixed color, for modulation for the image to be modulated; compared to a technical solution where the fluorescent light of the fourth mixed color is filtered into the fluorescent light of the second primary color so that the laser light of the first primary color, the laser light of the second primary color, and the fluorescent light of the second primary color serve as three primary color light for modulation for the image in the first color gamut range, the brightness of the image obtained by modulating can be increased since this embodiment does not filter out the fluorescent light of the third primary color in the fluorescent light of the fourth mixed color.

In addition, in this embodiment, the light source device is configured to, when the pixels of the image to be modulated belong to the second color gamut range, output the laser light of the first primary color, the laser light of the third primary color, and the fluorescent light of the fourth mixed color, for modulation for the image to be modulated; relative to a technical solution where the fluorescent light of the fourth mixed color is filtered into the fluorescent light of the third primary color so that the laser light of the first primary color, the laser light of the third primary color, and the fluorescent light of the third primary color serve as three primary color light for modulation for the image in the second color gamut range, the brightness of the image obtained by modulating can be increased since this embodiment does not filter out the fluorescent light of the second primary color in the fluorescent light of the fourth mixed color.

In an embodiment, the first color gamut range is divided into a first color gamut sub-range and a second color gamut sub-range; the second color gamut sub-range is closer to the second color gamut range than the first color gamut sub-range; the light source device is configured to, when the pixels of the image to be modulated belong to the first color gamut sub-range, output the laser light of the first primary color, the laser light of the second primary color, and the fluorescent light of the second primary color that is obtained by filtering the fluorescent light of the fourth mixed color, for modulation for the image to be modulated.

In this embodiment, the fluorescent light of the third primary color in the fluorescent light of the fourth mixed color is filtered out so as to obtain the fluorescent light of the second primary color, and the laser light of the first primary color, the laser light of the second primary color, and the fluorescent light of the second primary color are used for modulation for the image in the first color gamut sub-range, so compared with a technical solution where the laser light of the first primary color, the laser light of the second primary color, and the fourth primary color fluorescent light are used for modulation for an image in the first color gamut sub-range, a usage amount of the laser light of the second primary color can be reduced, that is, the brightness of the laser light of the second primary color can be reduced, thereby saving the energy of the laser light source.

In an embodiment, the first color gamut range is divided into a first color gamut sub-range and a second color gamut sub-range; and the second color gamut sub-range is closer to the second color gamut range than the first color gamut sub-range; the light source device is configured to, when the pixels of the image to be modulated belong to the second color gamut sub-range, output mixed light of the laser light of the first primary color, the laser light of the second primary color and the fluorescent light of the fourth mixed color, and the fluorescent light of the fourth mixed color, for modulation for the image to be modulated.

In this embodiment, the laser light of the second primary color and the fluorescent light of the fourth mixed color are output at the same time in the same time period, while mixed light of the two is used as one primary color light for modulation for the image, so compared with a technical solution where the laser light of the first primary color, the laser light of the second primary color, and the fluorescent light of the fourth mixed color are used for modulation of the second color gamut sub-range, this embodiment additionally outputs the fluorescent light of the fourth mixed color during one time period, which can improve overall brightness of the image obtained by modulation.

In an embodiment thereof, the second color gamut range is divided into a third color gamut sub-range and a fourth color gamut sub-range; and the third color gamut sub-range is closer to the first color gamut range than the fourth color gamut sub-range; the light source device is configured to, when the pixels of the image to be modulated belong to the third color gamut sub-range, output the laser light of the first primary color, the fluorescent light of the fourth mixed color, and mixed light of the laser light of the third primary color and the fluorescent light of the fourth mixed color, for modulation for the image to be modulated.

In this embodiment, the laser light of the third primary color and the fluorescent light of the fourth mixed color are output at the same time in the same time period, while mixed light of the two is used as one primary color light for modulation for the image, so compared with a technical solution where the laser light of the first primary color, the laser light of the third primary color, and the fluorescent light of the fourth mixed color are used for modulation for the third color gamut sub-range, this embodiment additionally outputs the fluorescent light of the fourth mixed color during one time period, which can improve overall brightness of the image obtained by modulation.

In an embodiment, the second color gamut range is divided into a third color gamut sub-range and a fourth color gamut sub-range; and the third color gamut sub-range is closer to the first color gamut range than the fourth color gamut sub-range; the light source device is configured to, when the pixels of the image to be modulated belong to the fourth color gamut sub-range, output the laser light of the first primary color, the laser light of the third primary color, and the fluorescent light of the third primary color that is obtained by filtering the fluorescent light of the fourth mixed color, for modulation for the image to be modulated.

In this embodiment, the fluorescent light of the second primary color in the fluorescent light of the fourth mixed color is filtered out so as to obtain the fluorescent light of the third primary color, and the laser light of the first primary color, the laser light of the third primary color, and the fluorescent light of the third primary color are used for modulation for the image in the fourth color gamut sub-range, so compared with a technical solution where the laser light of the first primary color, the laser light of the third primary color, and the fourth primary color fluorescent light are used for modulation for the image in the fourth color gamut sub-range, a usage amount of the laser light of the third primary color can be reduced, that is, the brightness of the laser light of the third primary color can be reduced, thereby saving energy of the laser light source.

In an embodiment, the light source device includes:

an excitation light source configured to emit the laser light of the first primary color;

a wavelength conversion device including a conversion region and a guide region, the conversion region and the guide region periodically moving to be circularly located in an optical path of the laser light of the first primary color; the conversion region is configured to absorb the laser light of the first primary color, and generate and emit the fluorescent light of the fourth mixed color; and the guide region is configured to guide the laser light of the first primary color to exit;

a second primary-color light source configured to emit the laser light of the second primary color; and a third primary-color light source configured to emit the laser light of the third primary color.

In an embodiment, the light source device further includes:

a filter device including a first filter region, a second filter region and a transparent region;

the first filter region is capable of being driven to an optical path of the fluorescent light of the fourth mixed color to filter the fluorescent light of the fourth mixed color so as to obtain fluorescent light of the second primary color;

the second filter region is capable of being driven to the optical path of the fluorescent light of the fourth mixed color to filter the fluorescent light of the fourth mixed color so as to obtain fluorescent light of the third primary color; and the transparent region is capable of being driven to the optical path of the fluorescent light of the fourth mixed color so that the fluorescent light of the fourth mixed color passes through the transparent region.

In an embodiment, the laser light of the first primary color is blue laser light; the laser light of the second primary color is green laser light; the laser light of the third primary color is red laser light; the fluorescent light of the fourth mixed color is yellow fluorescent light; the fluorescent light of the second primary color is green fluorescent light; and the fluorescent light of the third primary color is red fluorescent light.

The present disclosure further provides a method for adjusting color gamut applied to the projection device, the method including:

determining a color gamut range of pixels of an image to be modulated, and transmitting instructions according to the determined color gamut range so that light from laser light of a first primary color, laser light of a second primary color, laser light of a third primary color and fluorescent light of a fourth mixed color, which is required for modulation for the image to be modulated, is outputted, wherein the laser light of the first primary color, the laser light of the second primary color and the fluorescent light of the fourth mixed color are capable of being modulated into an image in a first color gamut range; the laser light of the first primary color, the laser light of the third primary color and the fluorescent light of the fourth mixed color are capable of being modulated into an image in a second color gamut range; and the first color gamut range and the second color gamut range are combined into a continuous color gamut range.

Beneficial Effects

Compared with the related art, the present disclosure has following advantages:

In the present disclosure, the laser light is used for modulation for the image, and an image with a wide color gamut can be modulated, and the color gamut range of the pixels of the image to be modulated is also determined, the light source device is controlled to output required light according to the color gamut range, while unnecessary light can be turned off, thereby saving energy of the light source.

DESCRIPTION OF EMBODIMENTS

In order to make those skilled in the art better understand the technical solutions of the present disclosure, the present disclosure will be described in further detail below with reference to the accompanying drawings and specific embodiments.

Figure 1:
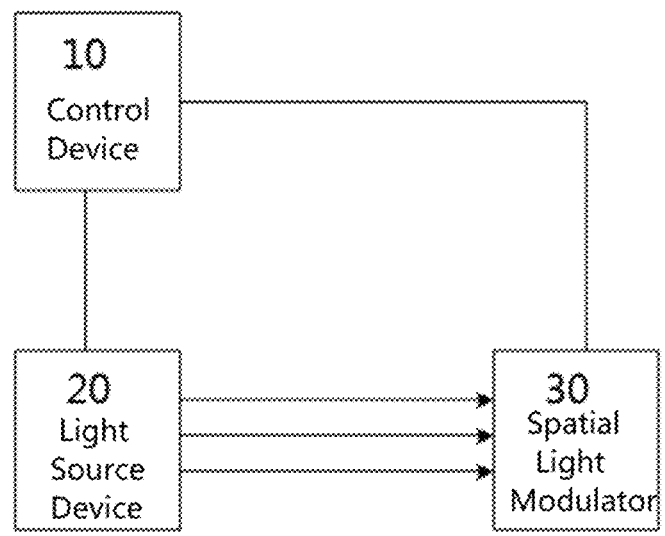
FIG. 1 is a principle schematic diagram of constitutional components of a projection device in accordance with the present disclosure.

As shown in FIG. 1, an embodiment of the present disclosure provides a projection device, including: a control device 10, a light source device 20 and a spatial light modulator 30; the control device 10 controls the light source device 20 to output light according to instructions, and color, brightness and time period of the light output by the light source device 20 are related to the instructions given by the control device 10; the light output by the light source device 20 is irradiated on the spatial light modulator 30, and the control device 10 controls the spatial light modulator 30 to modulate the light output by the light source device 20, in order to generate a predetermined image.

Figure 2:
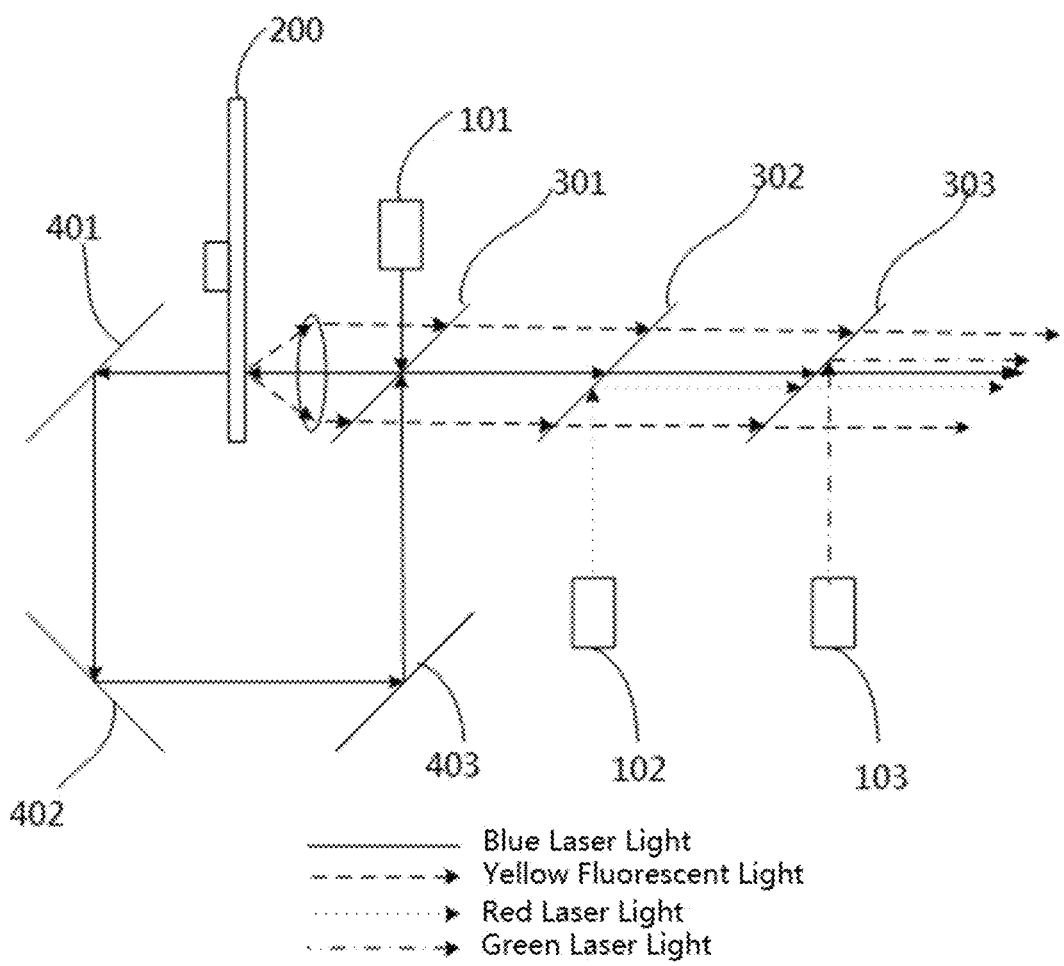
FIG. 2 is a structural schematic diagram of a light source device in accordance with an embodiment of the present disclosure.

In an embodiment, a structural schematic diagram of the light source device 20 is as shown in FIG. 2, the light source device 20 includes a blue laser light source 101, a red laser light source 102, and a green laser light source 103 which are respectively distributed on two sides of an optical path of the light source device, and a wavelength conversion device 200, a first beam-splitting filter 301, a second beam-splitting filter 302, and a third beam-splitting filter 303 are sequentially provided in the optical path of the light source device. The first beam-splitting filter 301 reflects blue light and transmits yellow fluorescent light, and the light emitted by the blue laser light source 101 is reflected by the first beam-splitting filter 301 to the wavelength conversion device 200, to excite fluorescent light on the wavelength conversion device 200; the second beam-splitting filter 302 transmits the blue light and the yellow fluorescent light and reflects red light, and light emitted by the red laser light source 102 is reflected by the second beam-splitting filter 302 to the optical path of the emitted light; the third beam-splitting filter 303 transmits the blue light and the yellow fluorescent light and reflects green light, and light emitted by the green laser light source 103 is reflected by the third beam-splitting filter 303 to the optical path of the emitted light.

Figure 3:
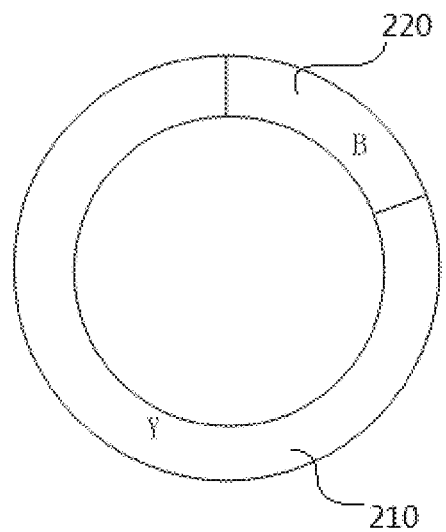
FIG. 3 is a schematic diagram of a wavelength conversion device in a light source device in accordance with an embodiment of the present disclosure.

A structural schematic diagram of the wavelength conversion device 200 is as shown in FIG. 3, the device 200 includes: a conversion region 210, a guide region 220, and a driving motor (not shown). The conversion region 210 and the guide region 220 are rotated under driving of the driving motor, so as to be periodically and alternately located on an optical path of the blue laser light. In the present embodiment, the guide region 220 is a transmission region for transmitting the blue laser light. In other embodiments, the guide region 220 may also be a reflection region for reflecting the blue laser light. The conversion region 210 contains a yellow fluorescent material for absorbing the blue laser light and generating the yellow fluorescent light. The light transmitted by the wavelength conversion device 200 is reflected to the first beam-splitting filter 301 by a first reflective lens 401, a second reflective lens 402 and a third reflective lens 403 which are respectively arranged behind and below the wavelength converting device 200 as shown in FIG. 2, and then reflected to the optical path of the emitted light; the light directly reflected by the wavelength conversion device 200 is directly transmitted through the first beam-splitting filter 301.

Figure 4:
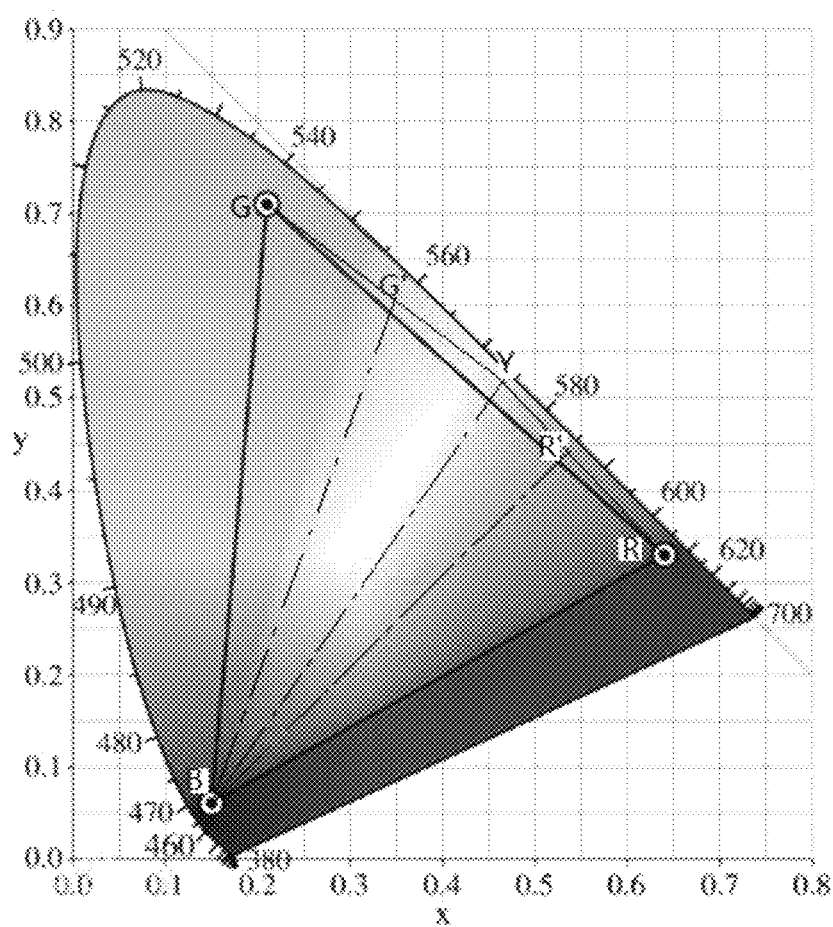
FIG. 4 is a schematic diagram of division of color gamut ranges of pixels of a modulated image of a projection device in accordance with the present disclosure.

Referring to FIG. 4, in an embodiment, when pixels of an image to be modulated belong to a GYB color gamut range, the red laser light source 102 is turned off, and the light source device 20 outputs the blue laser light, the green laser light, and the yellow fluorescent light for modulation for the image to be modulated.

Figure 5:
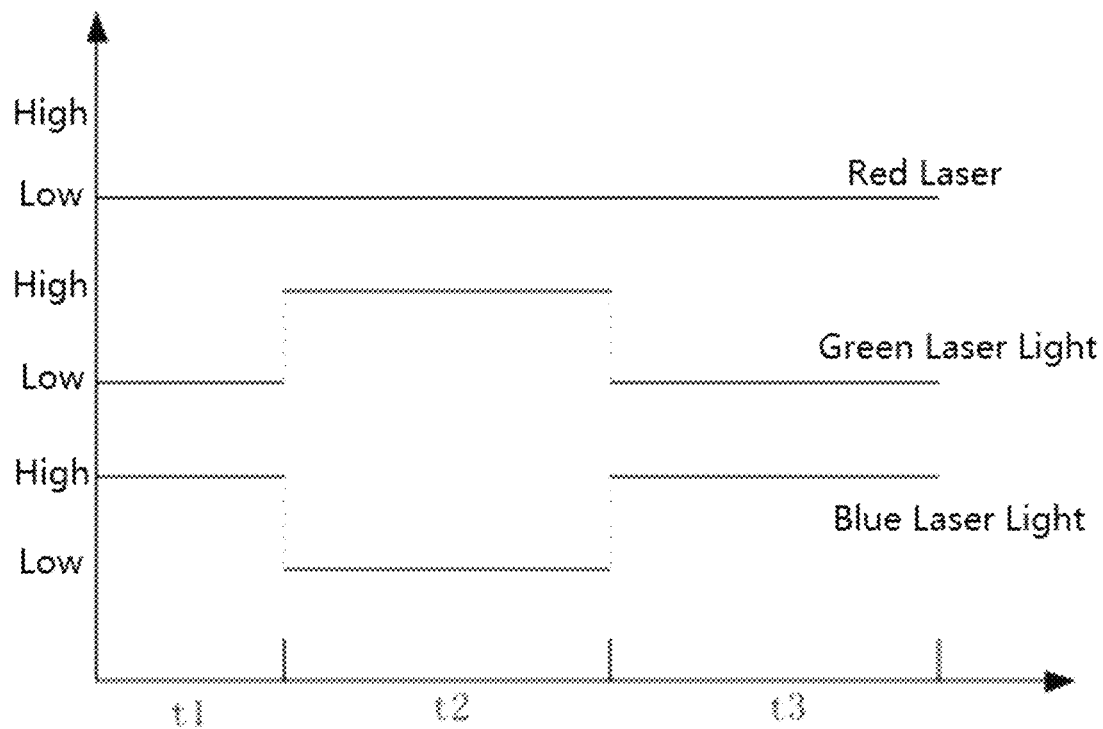
FIGS. 5-7 are schematic diagrams of ON and OFF time periods of light sources of a projection device and a wavelength conversion device when pixels of a modulated image are located in a GYB or YRB color gamut range in accordance with embodiments of the present disclosure.
Figure 6:
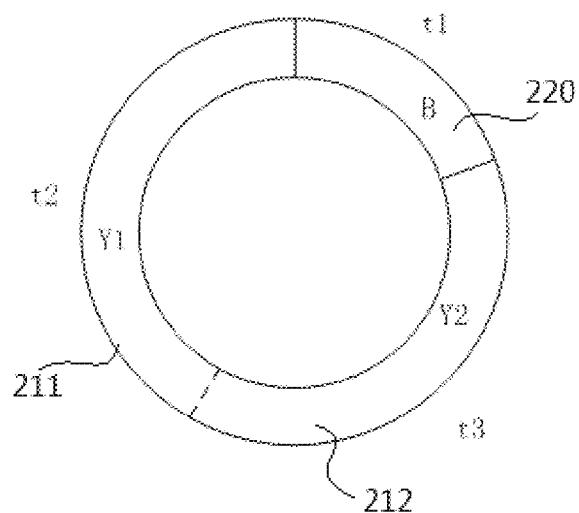

In an embodiment, time for one revolution of the wavelength conversion device 200 is taken as one modulation cycle T, ON and OFF time periods of the respective light sources are as shown in FIG. 5, and time periods in which respective segments of the wavelength conversion device 200 are located in the optical path of the blue laser light is as shown in FIG. 6.

A low waveband means that laser light is turned off, and a high waveband means that laser light is turned on.

During a time period of t1, the blue laser light source 101 is turned on, the green laser light source 103 and the red laser light source 102 are turned off, the guide region 220 of the wavelength conversion device 200 is located in the optical path of the blue laser light, the blue laser light is transmitted through the guide region 220, reflected by the first reflective lens 401, the second reflective lens 402, the third reflective lens 403 and the first beam-splitting filter 301 and then further transmitted through the second beam-splitting filter 302 and the third beam-splitting filter 303, thus the blue laser light is output.

During a time period of t2, the green laser light source 103 is turned on, the blue laser light source 101 and the red laser light source 102 are turned off, a first zone of the conversion region 210 of the wavelength conversion device 200 is located in the optical path of the blue laser light, and the conversion region 210 absorbs the blue laser light to generate the yellow fluorescent light, which is transmitted through the first beam-splitting filter 301 and output; the green laser light is reflected by the third beam-splitting filter 303 and then is output.

During a time period of t3, the blue laser light source 101 is turned on, the green laser light source 103 and the red laser light source 102 are turned off, a second zone of the conversion region 210 of the wavelength conversion device 200 is located in the optical path of the blue laser light, and the blue laser light excites the yellow fluorescent material to generate the yellow fluorescent light and then output; the yellow fluorescent light is emitted to the first beam-splitting filter 301, and further transmitted through the first beam-splitting filter 301, the second beam-splitting filter 302 and the third beam-splitting filter 303, and then is output.

Proportions of durations of the t1 time period, the t2 time period and the t3 time period can be adjusted as needed.

In an embodiment, when the pixels of the image to be modulated belong to the YRB color gamut range, the green laser light source is turned off, and the light source device 20 outputs the blue laser light, the red laser light, and the yellow fluorescent light for modulation for the image to be modulated.

Figure 7:
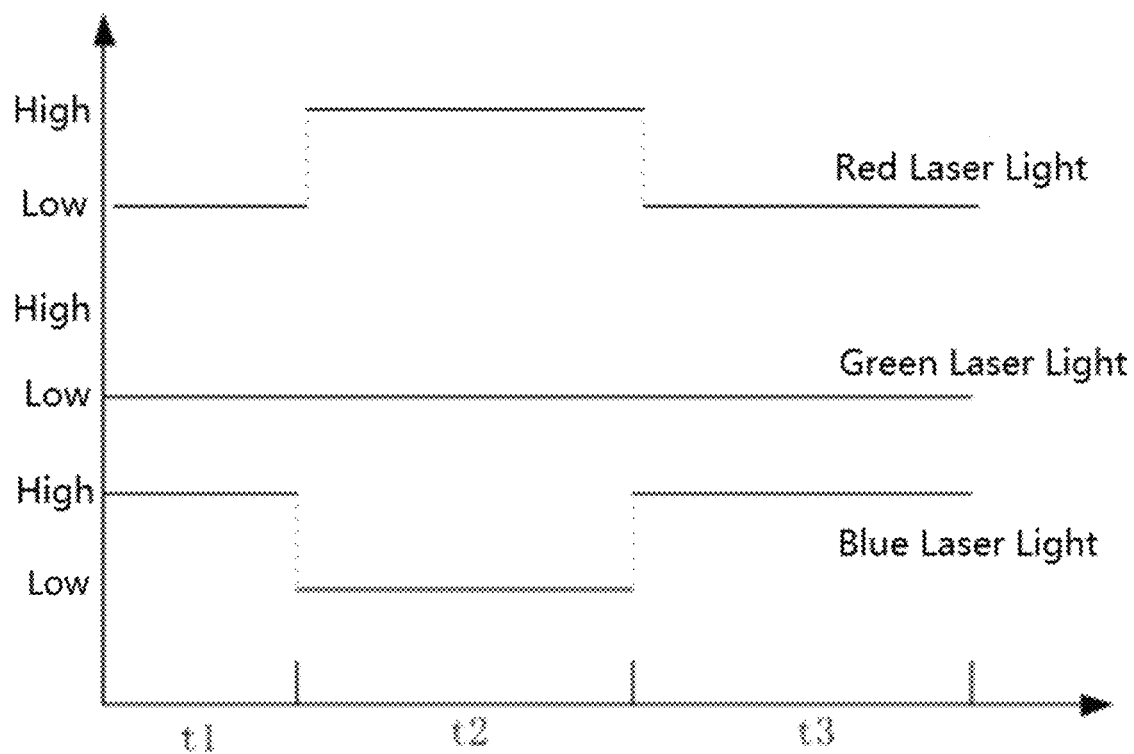

In an embodiment, time for one revolution of the wavelength conversion device 200 is taken as one modulation cycle T, ON and OFF time periods of the respective light sources are as shown in FIG. 7, and the time periods in which respective segments of the wavelength conversion device 200 are located in the optical path of the blue laser light is as shown in FIG. 6, in which:

During a time period of t1, the blue laser light source 101 is turned on, the green laser light source 103 and the red laser light source 102 are turned off, the guide region 220 of the wavelength conversion device 200 is located in the optical path of the blue laser light, the blue laser light is transmitted through the guide region 220, reflected by the first reflective lens 401, the second reflective lens 402, the third reflective lens 403 and the first beam-splitting filter 301 and then further transmitted through the second beam-splitting filter 302 and the third beam-splitting filter 303, thus the blue laser light is output.

During a time period of t2, the red laser light source 102 is turned on, the blue laser light source 101 and the green laser light source 103 are turned off, the first zone 211 of the conversion region 210 of the wavelength conversion device 200 is located in the optical path of the blue laser light; after being reflected by the second beam-splitting filter 302, the red laser light is further transmitted through the third beam-splitting filter 303 and then is output.

During a time period of t3, the blue laser light source 101 is turned on, the green laser light source 103 and the red laser light source 102 are turned off, the second zone 212 of the conversion region 210 of the wavelength conversion device 200 is located in the optical path of the blue laser light, and the blue laser light excites the yellow fluorescent material to generate the yellow fluorescent light; the yellow fluorescent light is emitted to the first beam-splitting filter 301, and further transmitted through the first beam-splitting filter 301, the second beam-splitting filter 302, and the third beam-splitting filter 303, and then is output.

It can be understood that, when modulating an image in the YRB color gamut range and modulating an image in the GYB color gamut range, proportions of durations of the t1 time period, the t2 time period, and the t3 time period may be different, and the brightness of the respective laser light of three colors may also be different.

Figure 8:
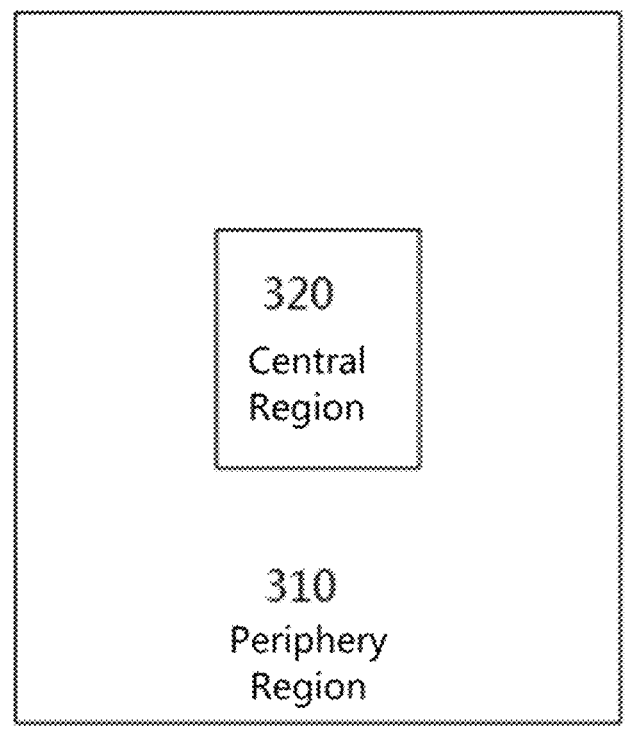
FIG. 8 is a schematic diagram of a second beam-splitting filter and a third beam-splitting filter in accordance with an embodiment of the present disclosure.

In an embodiment, combination of the red laser light and the yellow fluorescent light, and combination of the green laser light and the yellow fluorescent light can be combined using different etendue therebetween; the etendue of the laser light is smaller than the etendue of the fluorescent light. In an embodiment, structures of the second beam-splitting filter 302 and the third beam-splitting filter 303 may be as shown in FIG. 8, and an area of a central region 320 is smaller than an area of a periphery region 310. The red laser light is reflected by the central region 320 of the second beam-splitting filter 302, and red fluorescent light in the yellow fluorescent light can be transmitted through the periphery region 310 of the second beam-splitting filter 302; green fluorescent light in the yellow fluorescent light can be transmitted through the central region 320 and the periphery region 310 of the second beam-splitting filter 302. Similarly, the green laser light is reflected by the central region 320 of the third beam-splitting filter 303, the green fluorescent light in the yellow fluorescent light can be transmitted through the periphery region 310 of the third beam-splitting filter 303, and the red fluorescent light in the yellow fluorescent light can be transmitted through the central region 320 and the periphery region 310 of the third beam-splitting filter 303.

In an embodiment, when the image to be modulated contains pixels located in the GYB color gamut range and pixels located in the YRB color gamut range, the light source device 20 outputs laser light of first primary color, laser light of second primary color, laser light of third primary color, and fluorescent light of fourth mixed color for modulation for the image to be modulated.

Figure 9:
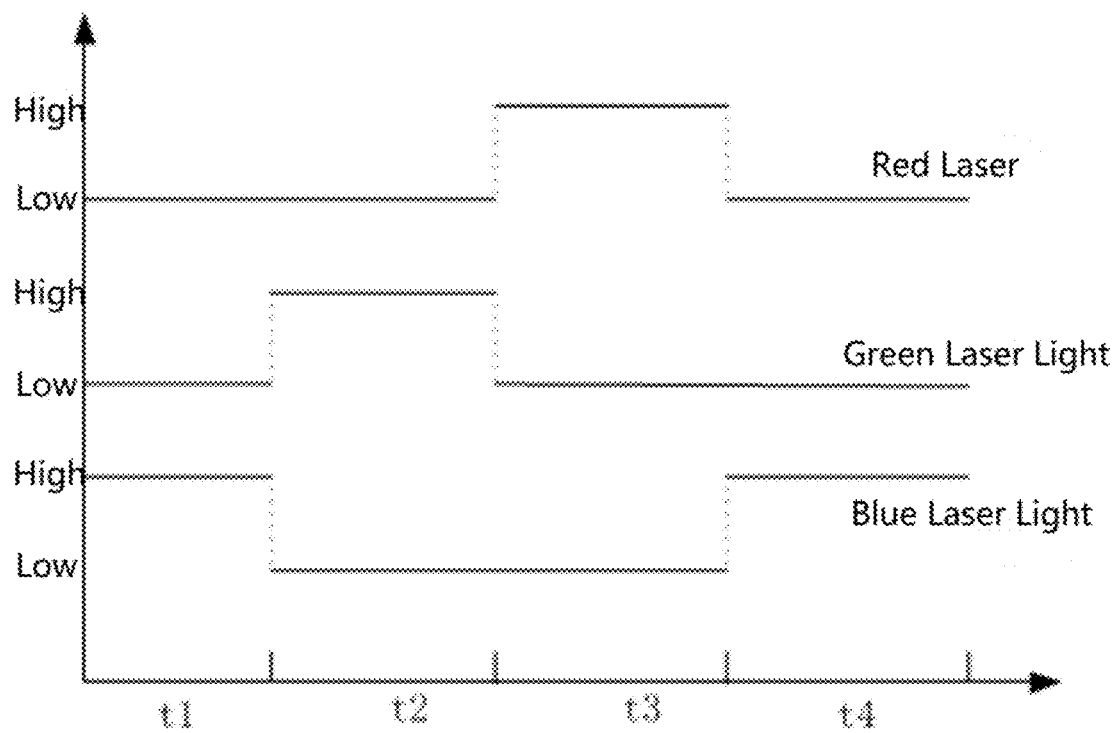
FIGS. 9 and 10 are schematic diagrams of ON and OFF time periods of light sources of a projection device and a wavelength conversion device when pixels of a modulated image are located in GYB and YRB color gamut ranges in accordance with embodiments of the present disclosure.
Figure 10:
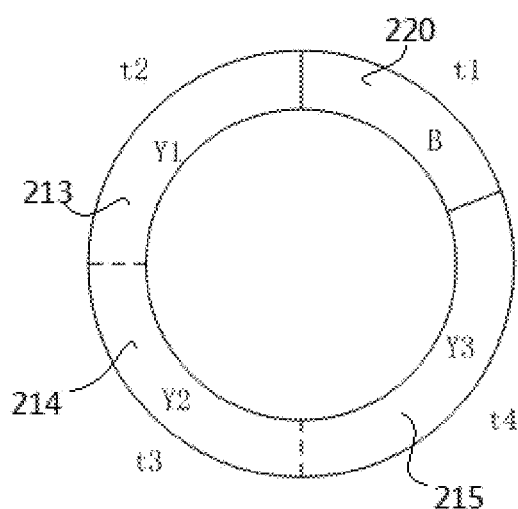

In an embodiment, time for one revolution of the wavelength conversion device 200 is taken as one modulation cycle T, ON and OFF time periods of the respective light sources are as shown in FIG. 9, and time periods in which respective segments of the wavelength conversion device 200 are located in the optical path of the blue laser light is as shown in FIG. 10.

A low waveband means that laser light is turned off, and a high waveband means that laser light is turned on.

During a time period of t1, the blue laser light source 101 is turned on, the green laser light source 103 and the red laser light source 102 are turned off, the guide region 220 of the wavelength conversion device 200 is located in the optical path of the blue laser light, the blue laser light is transmitted through guide region 220, reflected by the first reflective lens 401, the second reflective lens 402, the third reflective lens 403 and the first beam-splitting filter 301, and then further transmitted through the second beam-splitting filter 302 and the third beam-splitting filter 303, thus the blue laser light is output.

During a time period of t2, the green laser light source 103 is turned on, the blue laser light source 101 and the red laser light source 102 are turned off, and the first zone 213 of the conversion region of the wavelength conversion device 200 is located in the optical path of the blue laser light; the green laser light is reflected by the third beam-splitting filter 303 and then is output.

During a time period of t3, the red laser light source 102 is turned on, the blue laser light source 101 and the green laser light source 103 are turned off, and the second zone 214 of the conversion region of the wavelength conversion device 200 is located in the optical path of the blue laser light; the red laser light is reflected by the second beam-splitting filter 302 and transmitted through the third beam-splitting filter 303 and then is output.

During a time period of t4, the blue laser light source 101 is turned on, the green laser light source 103 and the red laser light source 102 are turned off, a third zone 215 of the conversion region of the wavelength conversion device 200 is located in the optical path of the blue laser light, and the blue laser light excites the yellow fluorescent material to generate the yellow fluorescent light; the yellow fluorescent light is emitted to the first beam-splitting filter 301, and further transmitted through the first beam-splitting filter 301, the second beam-splitting filter 302, and the third beam-splitting filter 303, and then is output.

In an embodiment, the GYB color gamut range is divided into a GG'B color gamut range and a G'YB color gamut range; the G'YB color gamut range is closer to the YRB color gamut range than the GG'B color gamut range; the YRB color gamut range is divided into a YR'B color gamut range and a R'RB color gamut range, and the YR'B color gamut range is closer to the GYB color gamut range than the R'RB color gamut range.

In an embodiment, when the pixels of the image to be modulated belong to the GG'B color gamut range, the light source device 20 outputs the blue laser light and the green laser light and outputs the green fluorescent light obtained by filtering the yellow fluorescent light for modulation for the image to be modulated.

Figure 11:
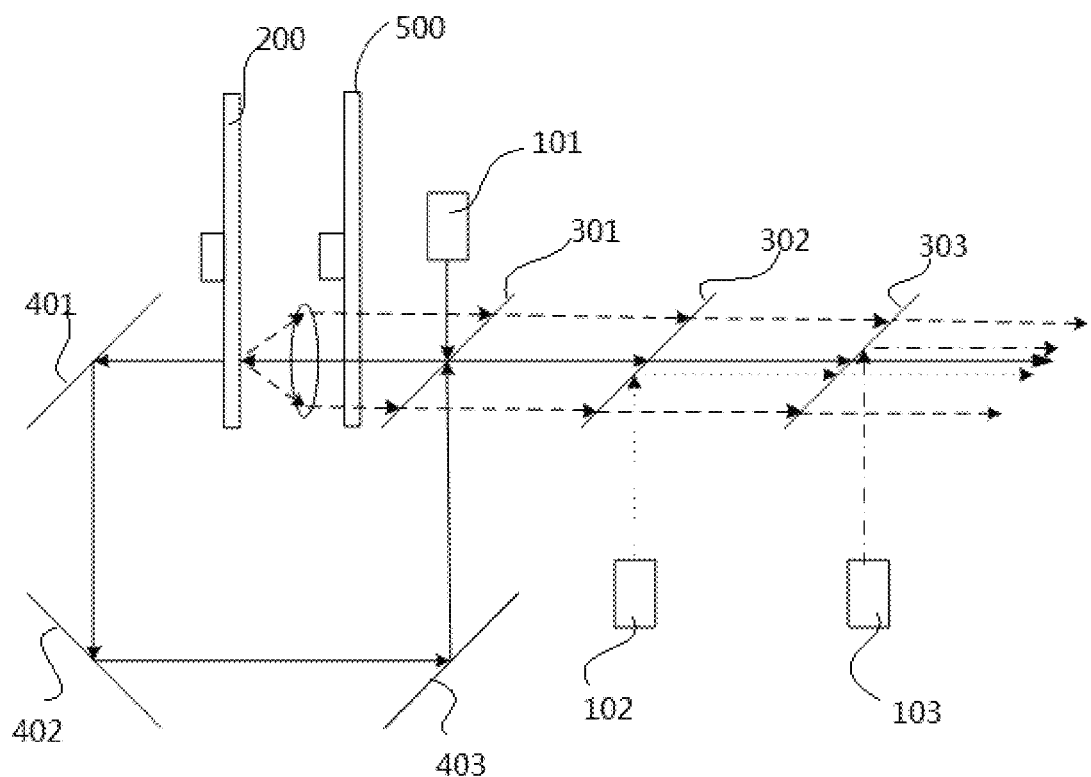
FIG. 11 is a schematic diagram in accordance with an embodiment of a light source device provided with a filter device in accordance with the present disclosure.
Figure 12:
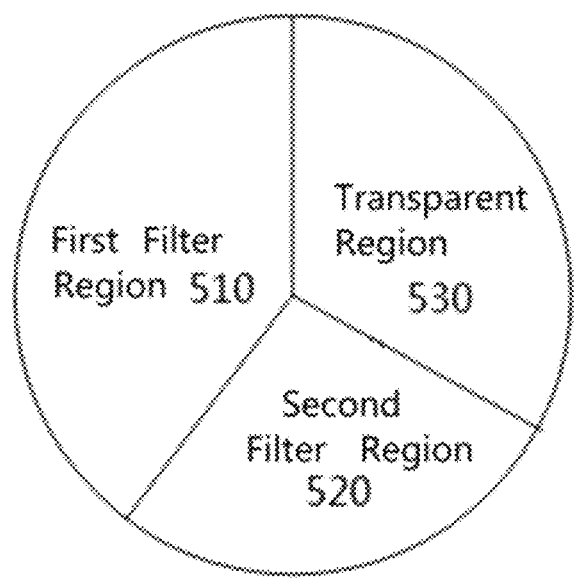
FIG. 12 is a schematic diagram of a filter device shown in FIG. 11 in accordance with an embodiment of the present disclosure.

In an embodiment, as shown in FIG. 11, the light source device 20 further includes: a filter device 500. As shown in FIG. 12, the filter device 500 includes a first filter region 510, a second filter region 520, a transparent region 530, and a driving motor (not shown in the drawing).

In the present embodiment, the blue laser light source 101, the green laser light source 103 and the red laser light source 102 can be turned on and off according to FIG. 5, and the first filter region 510 of the filter device is driven to an optical path of yellow fluorescent light, to filter the yellow fluorescent light and obtain the green fluorescent light, so that the blue laser light, the green laser light, and the green fluorescent light are output to the spatial light modulator 30, for modulating the image to be modulated.

In an embodiment, when the pixels of the image to be modulated belong to the R'RB color gamut range, and the light source device 20 outputs the blue laser light, the red laser light and outputs the red fluorescent light obtained by filtering the yellow fluorescent light for modulation for the image to be modulated.

In an embodiment, in the present embodiment, the blue laser light source 101, the green laser light source 103, and the red laser light source 102 may be turned on and off according to FIG. 7, and the second filter region 520 of the filter device is driven to the optical path of yellow fluorescent light, in order to filter the yellow fluorescent light and obtain the red fluorescent light, so that the blue laser light, the green laser light, and the red fluorescent light are output to the spatial light modulator 30, for modulating the image to be modulated.

In an embodiment, when the pixels of the image to be modulated belong to the G'YB color gamut range, the light source device 20 outputs mixed light of the blue laser light, the green laser light and the yellow fluorescent light, and outputs the yellow fluorescent light for modulation for the image to be modulated.

Figure 13:
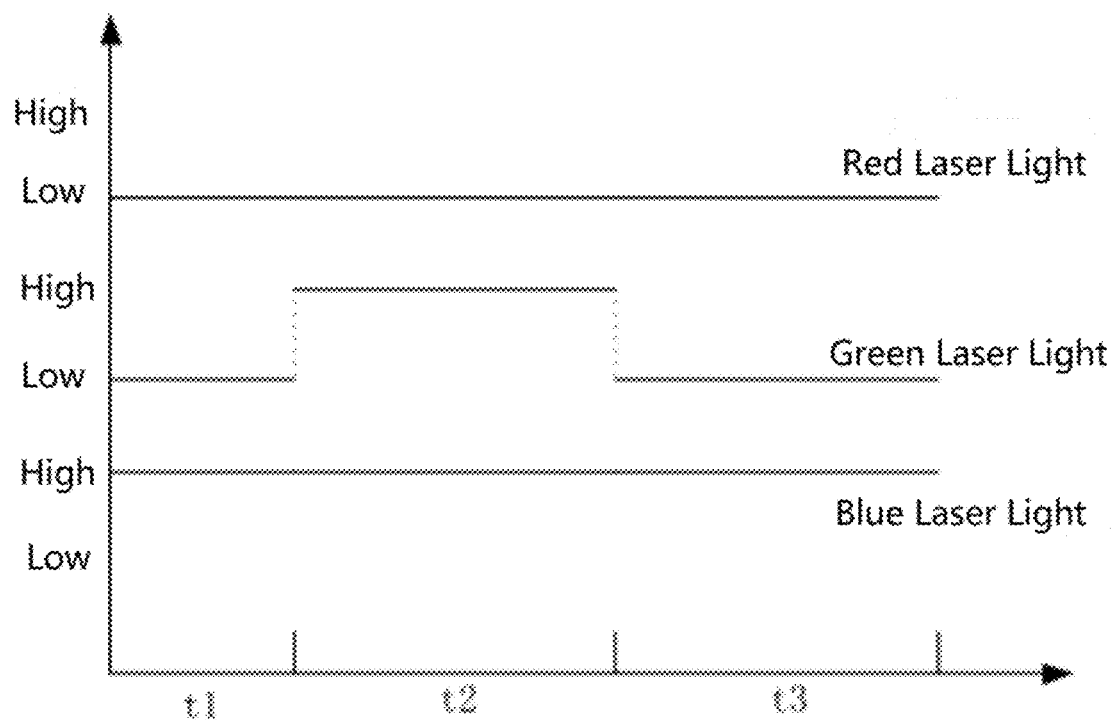
FIG. 13 is a schematic diagram of ON and OFF time periods of light sources of a projection device when pixels of a modulated image are located in a G'YB color gamut range in accordance with an embodiment of the present disclosure.

In an embodiment, the transmission region of the filter device is driven to the optical path of the yellow fluorescent light; taking time for one revolution of the wavelength conversion device 200 as one modulation cycle T, ON and OFF time periods of the respective light sources are as shown in FIG. 13, and the time periods in which respective segments of the wavelength conversion device 200 are located in the optical path of the blue laser light is as shown in FIG. 6.

During a time period of t1, the blue laser light source 101 is turned on, the green laser light source 103 and the red laser light source 102 are turned off, the guide region 220 of the wavelength conversion device 200 is located in the optical path of the blue laser light, the blue laser light is transmitted through the guide region 220, reflected by the first reflective lens 401, the second reflective lens 402, the third reflective lens 403 and the first beam-splitting filter 301, and then further transmitted through the second beam-splitting filter 302 and the third beam-splitting filter 303, thus the blue laser light is output.

During a time period of t2, the green laser light source 103 and the blue laser light source 101 are turned on, the red laser light source 102 is turned off, and the first zone of the conversion region 210 of the wavelength conversion device 200 is located in the optical path of the blue laser light; the blue laser light excites the yellow fluorescent material to generate the yellow fluorescent light; the yellow fluorescent light is emitted to the first beam-splitting filter 301, and further transmitted through the first beam-splitting filter 301, the second beam-splitting filter 302, and the third beam-splitting filter 303; the green laser light is reflected by the third beam-splitting filter 303; thus mixed light of the yellow fluorescent light and the green laser light is output.

During a time period of t3, the blue laser light source 101 is turned on, the green laser light source 103 and the red laser light source 102 are turned off, the second zone of the conversion region 210 of the wavelength conversion device 200 is located in the optical path of the blue laser light, and the blue laser light excites the yellow fluorescent material to generate the yellow fluorescent light; the yellow fluorescent light is emitted to the first beam-splitting filter 301, and further transmitted through the first beam-splitting filter 301, the second beam-splitting filter 302 and the third beam-splitting filter 303, and then is output.

In an embodiment, when the pixels of the image to be modulated belong to the YR'B color gamut range, the light source device 20 outputs the blue laser light, the yellow fluorescent light, and mixed light of the red laser light and the yellow fluorescent light for modulation for the image to be modulated.

Figure 14:
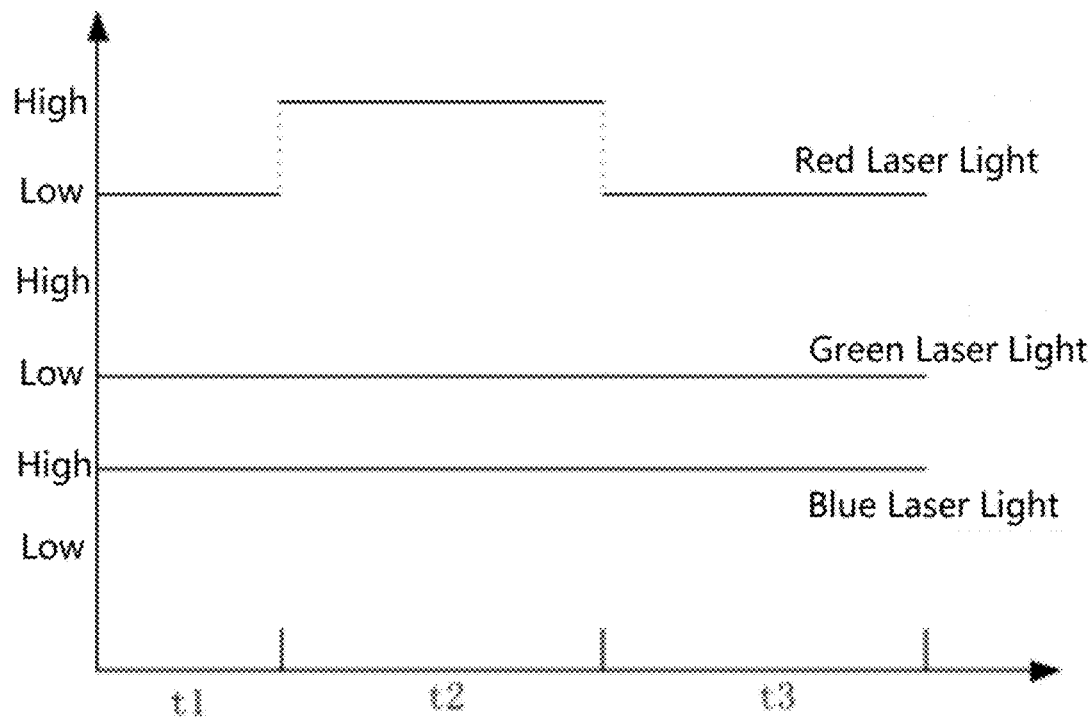
FIG. 14 is a schematic diagram of ON and OFF time periods of light sources of a projection device when pixels of a modulated image are located in an YR'B color gamut range in accordance with an embodiment of the present disclosure.

In an embodiment, the transmission region of the filter device is driven to the optical path of the yellow fluorescent light; taking time for one revolution of the wavelength conversion device 200 as one modulation cycle T, ON and OFF time periods of the respective light sources are as shown in FIG. 14, and the time periods in which respective segments of the wavelength conversion device 200 are located in the optical path of the blue laser light is as shown in FIG. 6.

During a time period of t1, the blue laser light source 101 is turned on, the green laser light source 103 and the red laser light source 102 are turned off, the guide region 220 of the wavelength conversion device 200 is located in the optical path of the blue laser light, the blue laser light is transmitted through the guide region 220, reflected by the first reflective lens 401, the second reflective lens 402, the third reflective lens 403 and the first beam-splitting filter 301, and then further transmitted through the second beam-splitting filter 302 and the third beam-splitting filter 303, thus the blue laser light is output.

During a time period of t2, the red laser light source 102 and the blue laser light source 101 are turned on, the green laser light source 103 is turned off, and the first zone of the conversion region 210 of the wavelength conversion device 200 is located in the optical path of the blue laser light; the blue laser light excites the yellow fluorescent material to generate the yellow fluorescent light; the yellow fluorescent light is emitted to the first beam-splitting filter 301, and further transmitted through the first beam-splitting filter 301, the second beam-splitting filter 302, and the third beam-splitting filter 303; the red laser light is reflected by the second beam-splitting filter 302, and further transmitted through the third beam-splitting filter 303; thus, mixed light of the yellow fluorescent light and the red laser light is output.

During a time period of t3, the blue laser light source 101 is turned on, the green laser light source 103 and the red laser light source 102 are turned off, the second zone of the conversion region 210 of the wavelength conversion device 200 is located in the optical path of the blue laser light, and the blue laser light excites the yellow fluorescent material to generate the yellow fluorescent light; the yellow fluorescent light is emitted to the first beam-splitting filter 301, and further transmitted through the first beam-splitting filter 301, the second beam-splitting filter 302, and the third beam-splitting filter 303, and then is output.

The above are only embodiments of the present disclosure which do not limit the patent scope of the present disclosure, and any equivalent structure or equivalent process made based on the description and drawings of the present disclosure, or those directly or indirectly applied in other related technical fields, are all included in the scope of patent protection of the present disclosure.

What is claimed is:

1. A projection device, comprising:
    a light source device configured to emit, according to instructions, laser light of a first primary color, laser light of a second primary color, laser light of a third primary color and fluorescent light of a fourth mixed color, wherein the laser light of the first primary color, the laser light of the second primary color and the fluorescent light of the fourth mixed color are capable of being modulated into an image in a first color gamut range, the laser light of the first primary color, the laser light of the third primary color and the fluorescent light of the fourth mixed color are capable of being modulated into an image in a second color gamut range, and the first color gamut range and the second color gamut range are combined into a continuous color gamut range; and
    a control device configured to determine a color gamut range of pixels of an image to be modulated, and transmit the instructions according to the color gamut range so as to control the light source device to output light, required for modulation for the image to be modulated, from the laser light of the first primary color, the laser light of the second primary color, the laser light of the third primary color, and the fluorescent light of the fourth mixed color,
    wherein the light source device comprises:
    an excitation light source configured to emit the laser light of the first primary color;
    a wavelength conversion device comprising a conversion region and a guide region, wherein the conversion region and the guide region periodically moves to be circularly located in an optical path of the laser light of the first primary color, the conversion region is configured to absorb the laser light of the first primary color, and generate and emit the fluorescent light of the fourth mixed color, and the guide region is configured to guide the laser light of the first primary color to exit;
    a second primary-color light source configured to emit the laser light of the second primary color; and
    a third primary-color light source configured to emit the laser light of the third primary color.

2. The projection device according to claim 1, wherein:
    the fluorescent light of the fourth mixed color comprises fluorescent light of the second primary color and fluorescent light of the third primary color; and
    the light source device is configured to output the laser light of the first primary color, the laser light of the second primary color and the fluorescent light of the fourth mixed color for modulation for the image to be modulated when the pixels of the image to be modulated belong to the first color gamut range, to output the laser light of the first primary color, the laser light of the third primary color and the fluorescent light of the fourth mixed color for modulation for the image to be modulated when the pixels of the image to be modulated belong to the second color gamut range, and to output the laser light of the first primary color, the laser light of the second primary color, the laser light of the third primary color and the fluorescent light of the fourth mixed color for modulation for the image to be modulated when the image to be modulated comprises pixels belonging to the first color gamut range and pixels belonging to the second color gamut range.

3. The projection device according to claim 1, wherein the fluorescent light of the fourth mixed color comprises fluorescent light of a second primary color and fluorescent light of a third primary color, the first color gamut range is divided into a first color gamut sub-range and a second color gamut sub-range, and the second color gamut sub-range is closer to the second color gamut range than the first color gamut sub-range; and
    wherein the light source device is configured to, when the pixels of the image to be modulated belong to the first color gamut sub-range, output the laser light of the first primary color, the laser light of the second primary color, and the fluorescent light of the second primary color that is obtained by filtering the fluorescent light of the fourth mixed color, for modulation for the image to be modulated.

4. The projection device according to claim 1, wherein the fluorescent light of the fourth mixed color comprises fluorescent light of a second primary color and fluorescent light of a third primary color, the first color gamut range is divided into a first color gamut sub-range and a second color gamut sub-range, and the second color gamut sub-range is closer to the second color gamut range than the first color gamut sub-range; and
    wherein the light source device is controlled to, when the pixels of the image to be modulated belong to the second color gamut sub-range, output mixed light of the laser light of the first primary color, the laser light of the second primary color and the fluorescent light of the fourth mixed color, and the fluorescent light of the fourth mixed color, for modulation for the image to be modulated.

5. The projection device according to claim 1, wherein the fluorescent light of the fourth mixed color comprises fluorescent light of a second primary color and fluorescent light of a third primary color, the second color gamut range is divided into a third color gamut sub-range and a fourth color gamut sub-range, and the third color gamut sub-range is closer to the first color gamut range than the fourth color gamut sub-range; and
    wherein the light source device is controlled to, when the pixels of the image to be modulated belong to the third color gamut sub-range, output the laser light of the first primary color, the fluorescent light of the fourth mixed color, and mixed light of the laser light of the third primary color and the fluorescent light of the fourth mixed color, for modulation for the image to be modulated.

6. The projection device according to claim 1, wherein the fluorescent light of the fourth mixed color comprises fluorescent light of a second primary color and fluorescent light of a third primary color, the second color gamut range is divided into a third color gamut sub-range and a fourth color gamut sub-range, and the third color gamut sub-range is closer to the first color gamut range than the fourth color gamut sub-range; and
    wherein the light source device is controlled to, when the pixels of the image to be modulated belong to the fourth color gamut sub-range, output the laser light of the first primary color, the laser light of the third primary color, and the fluorescent light of the third primary color that is obtained by filtering the fluorescent light of the fourth mixed color, for modulation for the image to be modulated.

7. The projection device according to claim 1, wherein the light source device further comprises a filter device comprising a first filter region, a second filter region and a transparent region, wherein:
- the first filter region is capable of being driven to an optical path of the fluorescent light of the fourth mixed color to filter the fluorescent light of the fourth mixed color so as to obtain fluorescent light of the second primary color;
- the second filter region is capable of being driven to the optical path of the fluorescent light of the fourth mixed color to filter the fluorescent light of the fourth mixed color so as to obtain fluorescent light of the third primary color; and
- the transparent region is capable of being driven to the optical path of the fluorescent light of the fourth mixed color so that the fluorescent light of the fourth mixed color passes through the transparent region.

8. The projection device according to claim 1, wherein the laser light of the first primary color is blue laser light, the laser light of the second primary color is green laser light, the laser light of the third primary color is red laser light, the fluorescent light of the fourth mixed color is yellow fluorescent light, the fluorescent light of the second primary color is green fluorescent light, and the fluorescent light of the third primary color is red fluorescent light.

9. A method for adjusting color gamut, which is applied to a projection device, wherein the projection device comprises:
- a light source device configured for emitting, according to instructions, laser light of a first primary color, laser light of a second primary color, laser light of a third primary color and fluorescent light of a fourth mixed color; and
- a control device,
- wherein the light source device comprises:
- an excitation light source configured for emitting the laser light of the first primary color;
- a wavelength conversion device comprising a conversion region and a guide region, wherein the conversion region and the guide region periodically moves to be circularly located in an optical path of the laser light of the first primary color, the conversion region is configured for absorbing the laser light of the first primary color, and generating and emitting the fluorescent light of the fourth mixed color, and the guide region is configured for guiding the laser light of the first primary color to exit;
- a second primary-color light source configured for emitting the laser light of the second primary color; and
- a third primary-color light source configured for emitting the laser light of the third primary color,
- wherein the method comprises:
- determining, by the control device, a color gamut range of pixels of an image to be modulated, and
- transmitting, by the control device, instructions according to the determined color gamut range so that light from laser light of a first primary color, laser light of a second primary color, laser light of a third primary color and fluorescent light of a fourth mixed color, which is required for modulation for the image to be modulated, is output, wherein:
- the laser light of the first primary color, the laser light of the second primary color and the fluorescent light of the fourth mixed color are capable of being modulated into an image in a first color gamut range;
- the laser light of the first primary color, the laser light of the third primary color and the fluorescent light of the fourth mixed color are capable of being modulated into an image in a second color gamut range; and
- the first color gamut range and the second color gamut range are combined into a continuous color gamut range.

10. The method according to claim 9, wherein the fluorescent light of the fourth mixed color comprises fluorescent light of the second primary color and fluorescent light of the third primary color; and
- the light source device is configured for outputting the laser light of the first primary color, the laser light of the second primary color and the fluorescent light of the fourth mixed color for modulation for the image to be modulated when the pixels of the image to be modulated belong to the first color gamut range, for outputting the laser light of the first primary color, the laser light of the third primary color and the fluorescent light of the fourth mixed color for modulation for the image to be modulated when the pixels of the image to be modulated belong to the second color gamut range, and for outputting the laser light of the first primary color, the laser light of the second primary color, the laser light of the third primary color and the fluorescent light of the fourth mixed color for modulation for the image to be modulated when the image to be modulated comprises pixels belonging to the first color gamut range and pixels belonging to the second color gamut range.

11. The method according to claim 9, wherein the fluorescent light of the fourth mixed color comprises fluorescent light of a second primary color and fluorescent light of a third primary color, the first color gamut range is divided into a first color gamut sub-range and a second color gamut sub-range, and the second color gamut sub-range is closer to the second color gamut range than the first color gamut sub-range; and
- wherein the light source device is configured for, when the pixels of the image to be modulated belong to the first color gamut sub-range, outputting the laser light of the first primary color, the laser light of the second primary color, and the fluorescent light of the second primary color that is obtained by filtering the fluorescent light of the fourth mixed color, for modulation for the image to be modulated.

12. The method according to claim 9, wherein the fluorescent light of the fourth mixed color comprises fluorescent light of a second primary color and fluorescent light of a third primary color, the first color gamut range is divided into a first color gamut sub-range and a second color gamut sub-range, and the second color gamut sub-range is closer to the second color gamut range than the first color gamut sub-range; and
- wherein the light source device is controlled for, when the pixels of the image to be modulated belong to the second color gamut sub-range, outputting mixed light of the laser light of the first primary color, the laser light of the second primary color and the fluorescent light of the fourth mixed color, and the fluorescent light of the fourth mixed color, for modulation for the image to be modulated.

13. The method according to claim 9, wherein the fluorescent light of the fourth mixed color comprises fluorescent light of a second primary color and fluorescent light of a third primary color, the second color gamut range is divided into a third color gamut sub-range and a fourth color gamut sub-range, and the third color gamut sub-range is closer to the first color gamut range than the fourth color gamut sub-range; and wherein the light source device is controlled for, when the pixels of the image to be modulated belong to the third color gamut sub-range, outputting the laser light of the first primary color, the fluorescent light of the fourth mixed color, and mixed light of the laser light of the third primary color and the fluorescent light of the fourth mixed color, for modulation for the image to be modulated.

14. The method according to claim 9, wherein the fluorescent light of the fourth mixed color comprises fluorescent light of a second primary color and fluorescent light of a third primary color, the second color gamut range is divided into a third color gamut sub-range and a fourth color gamut sub-range, and the third color gamut sub-range is closer to the first color gamut range than the fourth color gamut sub-range; and wherein the light source device is controlled for, when the pixels of the image to be modulated belong to the fourth color gamut sub-range, outputting the laser light of the first primary color, the laser light of the third primary color, and the fluorescent light of the third primary color that is obtained by filtering the fluorescent light of the fourth mixed color, for modulation for the image to be modulated.

15. The method according to claim 9, wherein the light source device further comprises a filter device comprising a first filter region, a second filter region and a transparent region, wherein:

the first filter region is capable of being driven to an optical path of the fluorescent light of the fourth mixed color to filter the fluorescent light of the fourth mixed color so as to obtain fluorescent light of the second primary color;

the second filter region is capable of being driven to the optical path of the fluorescent light of the fourth mixed color to filter the fluorescent light of the fourth mixed color so as to obtain fluorescent light of the third primary color; and the transparent region is capable of being driven to the optical path of the fluorescent light of the fourth mixed color so that the fluorescent light of the fourth mixed color passes through the transparent region.

16. The method according to claim 9, wherein the laser light of the first primary color is blue laser light, the laser light of the second primary color is green laser light, the laser light of the third primary color is red laser light, the fluorescent light of the fourth mixed color is yellow fluorescent light, the fluorescent light of the second primary color is green fluorescent light, and the fluorescent light of the third primary color is red fluorescent light.

* * * * *